No. 723,589. PATENTED MAR. 24, 1903.
T. C. DUFFIELD.
MACHINE FOR PRODUCING GLASS INSULATORS.
APPLICATION FILED NOV. 8, 1902.
NO MODEL. 2 SHEETS—SHEET 1.
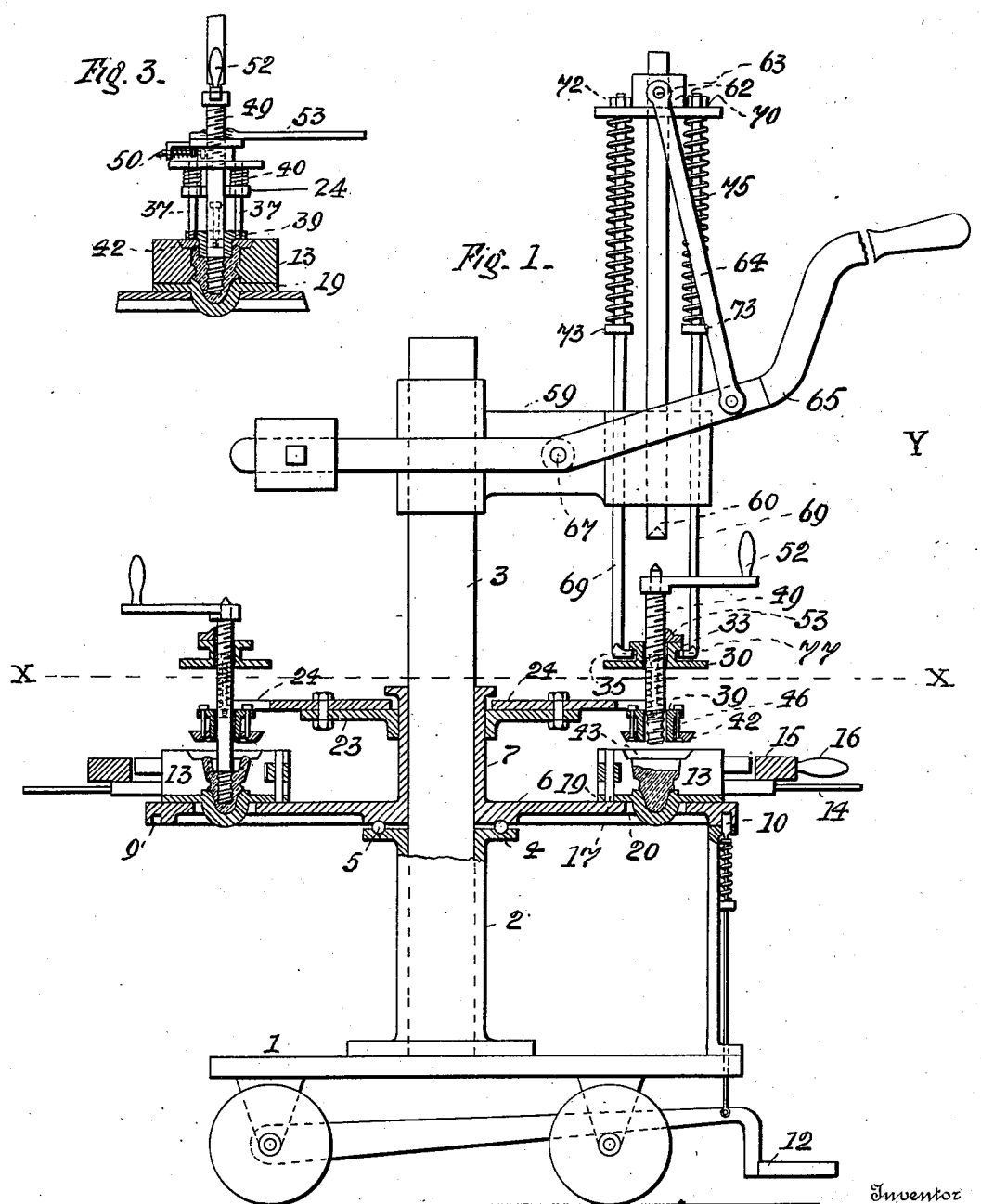

No. 723,589. PATENTED MAR. 24, 1903.
T. C. DUFFIELD.
MACHINE FOR PRODUCING GLASS INSULATORS.
APPLICATION FILED NOV. 8, 1902.
NO MODEL. 2 SHEETS—SHEET 2.
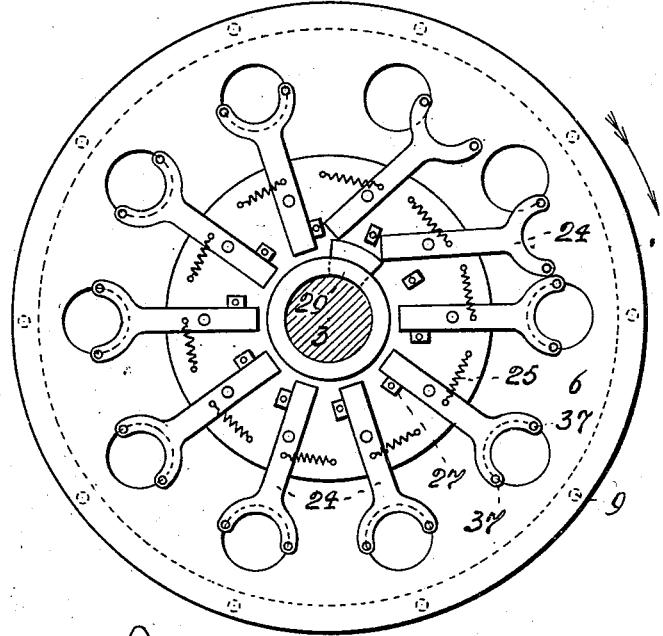
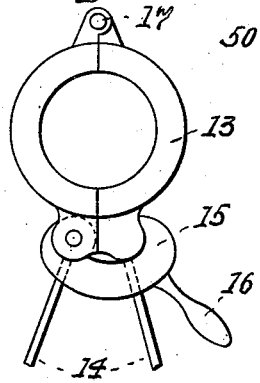
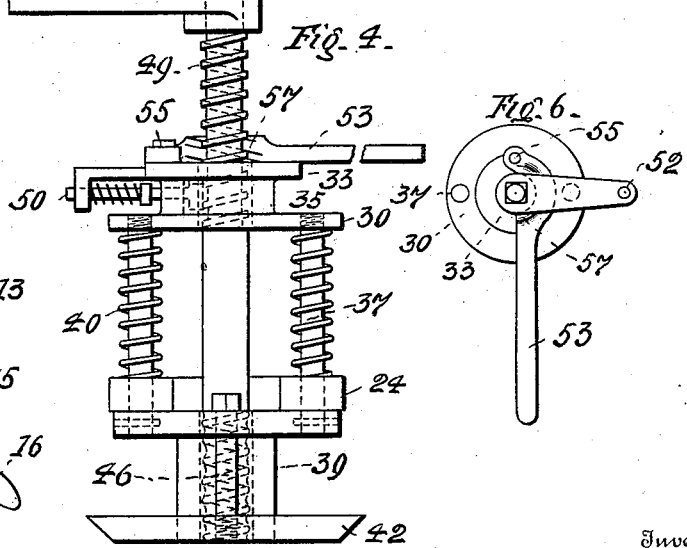
Witnesses
C. H. Walker.
George Brennan
Inventor
Thomas C. Duffield,
by Geo. W. T. Howard,
Attorneys

UNITED STATES PATENT OFFICE.

THOMAS C. DUFFIELD, OF BRIDGETON, NEW JERSEY.

MACHINE FOR PRODUCING GLASS INSULATORS.

SPECIFICATION forming part of Letters Patent No. 723,589, dated March 24, 1903.

Application filed November 8, 1902. Serial No. 130,516. (No model.)

*To all whom it may concern:*

Be it known that I, THOMAS C. DUFFIELD, of Bridgeton, in the county of Cumberland and State of New Jersey, have invented certain Improvements in Machines for Producing Glass Insulators, of which the following is a specification.

This invention relates to certain improvements in that class of machines for producing glass insulators in which a threaded spindle is plunged into a practically closed mold containing a mass of semifluid glass to give to the insulator formed therein an internal thread, as will hereinafter fully appear.

In carrying out my invention I provide the machine with a central column and a table adapted to rotate about the same, upon which are seated a series of molds, and a second table situated above the first and arranged to have a rotary movement in common with it. This second table supports over each mold a spindle with an external thread at its end adapted when plunged into a mass of molten glass contained in a mold to provide the same with a threaded cavity. The said spindles have also a second thread situated above the first and of a similar pitch, which, in connection with a half-nut adapted to be brought into contact therewith, admits of the spindles being unscrewed from their molds and the glass insulators contained therein. The second table also carries devices for shaping the upper part of the insulators and means for supporting the same, together with the threaded spindles and their immediate attachments and connections. The central column is provided with a single arm or bracket which supports means for depressing the devices for shaping the upper part of the insulators, together with the spindles, whereby the insulators are threaded as the molds are successively brought under them. With this construction an insulator is completed whenever a glass-charged mold is brought under the spindle-depressing devices and the same actuated, and the threaded spindles may be unscrewed from the insulators at any time after they have been moved from under the said depressing devices or at any time before the molds are again brought under them. The output of the machine is therefore increased, for the reason that considerably more time is allowed in which to unscrew a threaded spindle from an insulator than is required to charge a mold with melted glass, close the mold, and plunge the end of a threaded spindle into the mold and the glass confined therein, as will hereinafter fully appear.

In the further description of the said invention which follows reference is made to the accompanying drawings, forming a part hereof, and in which—

Figure 1 is a central partly-sectional elevation of the improved machine. Fig. 2 is a section of Fig. 1, taken on the dotted line X X, with certain parts thereof omitted. Figs. 3, 4, 5, and 6 are enlarged details of the machine and hereinafter described.

Referring now to the drawings, 1 is a wheeled platform or truck supporting the socket 2, in which rests the stationary column 3. The socket 2 is provided at its upper end with an exterior flange 4, having in its face a circular groove of a semicircular cross-section, in which are placed antifriction-balls 5.

6 is a circular table with an upwardly-extending hub 7, adapted to turn loosely about the column 3. It is provided with a circular groove like the one in the flange of the socket 2 and rests on the antifriction-balls, as shown in Fig. 1.

As it is necessary that the table 6 should have an intermittent rotary movement effected by hand and be held firmly and accurately in place at each stop or when an insulator is molded, it is provided with the holes 9, which are equidistant apart, and the end of the spring-supported bolt 10 is adapted to enter each one of the said holes in succession, and so hold the said table from passing beyond the stopping-point. The bolt 10 is withdrawn from a hole by means of the treadle 12, when the table may be again rotated.

13 13 are the molds proper, in which the insulators are formed. They are preferably ten in number, and by reference to Fig. 5 it will be seen that they are each in two parts or sections hinged together, and the opening and closing of the sections is effected by the handles 14, as is common in molds of this class. A hinged latch 15 (a well-known device having a handle 16) is used to lock the mold during the molding operation. Each mold is hinged at 17 (see Fig. 1) to a baseplate 19, fastened to the table 6, and the baseplate, which is practically a part of the mold, as it forms the top of the insulator, rests in a hole 20 in the table, and the holes 20 are on radial lines passing through the holes 9, before referred to.

23 is a second table fastened to the hub 7 of the first one 6 and at some considerable distance above it.

Referring now particularly to Fig. 2, it will be seen that the second table 23 is provided with ten pivoted forked carriers 24, each one of which is adapted to be yieldingly held in a radial position, with its forked end directly over the center of the mold 13, by means of a spring 25 and a stop 27.

29 is a lug or projection at one side of the central column 3 to deflect each carrier from a radial position and move its forked end from over the mold beneath for a limited time as it approaches the place where stands the operator, who is termed a "presserman," for a purpose hereinafter described.

The forked end of each carrier is provided with a circular plate 30, having a cylindrical projection on its upper side, and at the end of the projection is a collar 33, which is made larger in diameter than the said projection in order to form the annular peripheral recess 35.

The means whereby the plate 30 is attached to the forked end of the carrier consists of two fixed rods 37, which are secured in the said plate and extending downward pass loosely through the carrier and are fastened in the flange of a plunger 39, hereinafter described. Spiral springs 40, wound around the rods 37 and confined endwise between the circular plate 30 and the upper surface of the forked ends of the carrier, serve to sustain the said plate in its highest position above the carrier and at the same time draw the plunger into contact with the under side of that device.

42 is a circular follower with a beveled edge adapted to enter a correspondingly-shaped recess 43 in the upper face of the body of the mold 13, and it is provided with a circular groove, which forms the rounded edge of the flange of the insulator, as will hereinafter appear. This follower is arranged to slide vertically of the plunger 39, before referred to, and is suspended from the flange of that device by the bolts 46. The normal position of the follower with reference to the plunger is shown in Figs. 1 and 4.

From the above description it will be understood that the spiral springs 40 sustain the plate 30, and the rods around which the said springs are wound or coiled support the plunger 39, and that the said plunger sustains the follower 42 through the agency of the bolts 46.

49 is a spindle which passes loosely through the plate 30 and the plunger 39 and is held when elevated by friction produced by the end of the spring-bolt 50, which bears against the spindle, as shown in Fig. 3. The lower end of the spindle 49 is threaded, so that when it is plunged into a mass of semifluid glass and that substance closes around it the hole so formed will be provided with an internal thread. The upper end of the said spindle, which has a conical point, is also provided with a thread corresponding in pitch with that of the thread at its lower end.

52 is a crank-handle whereby the spindle 49 is turned to unscrew it from the insulator, as hereinafter described.

53 is a lever (see Fig. 6) pivoted at 55 to the face of the collar 33 of the circular plate 30, and it is provided with not less than one half-thread 57, adapted to engage with the thread on the upper end of the spindle 49 and when so engaged performs the office of a nut.

I have described the threaded spindle as an entirety; but as the lower end has to be heated before use to prevent chilling the semifluid glass in the mold when plunged therein and has at times to be reheated it is made removable; but as this feature is not new I have not shown the spindle in two parts with means for their connection.

59 is a fixed arm or bracket extending horizontally from the upper end of the column 3 and toward the front of the machine, which is denoted by Y and where the presserman or principal operator stands. The end of the arm 59 is bored, the hole being directly over the center of a mold when the same is in front of the presserman, and in the said hole is placed the vertically-sliding shaft 60. This shaft has a conical depression at its lower end, so as to fit over the point of the spindle 49, and fixed to its upper end is a cross-head 62, the ends of which, 63, are connected by links 64 to an overbalanced hand-lever 65, fulcrumed at 67 to the arm 59.

69 69 are rods adapted to slide vertically in holes in the arm 59 and through a flange 70, forming a part of the cross-head 62. Nuts 72 at the ends of the rods 69 limit their downward movement independently of the cross-head.

73 73 are collars on the rods 69, and 75 75 spiral springs coiled about the said rods and extending between the collars 73 and the under side of the flange of the cross-head 62.

The lower extremity of each rod 69 is turned inward to form a hook 77, and the two hooks are adapted, under circumstances hereinafter described, to enter the groove 35 of the plate 30.

The hooks 77 are always in front of the presserman, and therefore engage with or take hold of each plate 30 as it and its connections come to the front of the machine, and it is by them that each plate, with its plunger 39 and follower 42, is successfully forced down, so that the last two devices enter the mold proper beneath prior to the plunging of the threaded spindle into the semifluid glass therein.

The following is a description of the operation of making insulators by means of the present machine: Supposing the various parts or elements of the machine to be in the relative positions shown in Figs. 1 and 2, the gathering boy by means of a gathering-rod inserts a charge of soft glass into the mold situated to the right of the presserman, the entrance to which mold is exposed by the inner end of the carrier above it coming in contact with the projection 29 on the column 3. The charge is severed from the gathering-rod by the presserman, who by experience knows the quantity of glass necessary to form an insulator. The presserman then turns the table in the direction indicated by the curved arrow in Fig. 2, so as to bring the charged mold directly in front of him and its plate 30 into engagement with the hooks 77 of the rods 69, when the table is automatically stopped by the spring-bolt 10 entering one of the holes 9. The presserman then pulls down the overbalanced hand-lever 65, which depresses the rod 69 through the agency of the links 64, the cross-head 62, and the springs 75, and the hooked ends of the rods 69 being then in the groove 33 of the plate 30 that device is carried down, together with the plunger 39, containing the threaded spindle, and the follower 42, the last-named device falling by the force of gravity alone, it being loose on the plunger and sustained only by bolts 46. In this operation the follower is seated in the recess 43 in the body of the mold and the plunger forced into the mold, the spiral springs 40 being compressed in the operation, with the flange of the plunger resting on the follower, as shown in Fig. 3. At the conclusion of this part of the operation the lower end of the shaft 70 comes in contact with the upper end of the threaded spindle 49, and the latter is forced down and plunged into the mass of semifluid glass confined in the mold, and the glass, finding no means of escape, closes around the spindle and is thereby provided with an internal thread. This completes the operation of forming the insulator, and the presserman then releases the overbalanced hand-lever and turns the table until the next mold, with its carrier and connections, is brought to the front, when the operation as described is repeated. As soon as possible after a mold containing a completed insulator has passed from the presserman a boy pulls around the lever 53, so as to bring the half nut or thread forming a part of the said lever into engagement with the upper thread of the spindle 49. The boy now unscrews the threaded spindle from the glass insulator in the mold by means of the crank-handle 52, the half-nut on the lever 53 enforcing the proper movement of the spindle in the soft glass and preventing any strain being placed on the thread thereof. It will be understood that this unscrewing operation may be performed at any time after the mold has passed from the presserman, and the spindle has not to be connected with any extraneous unscrewing devices whatsoever. Consequently the rapidity of forming insulators is much increased.

I claim as my invention—

In a machine for making internally-threaded glass insulators, a rotary table having a series of molds seated thereon, and a follower, a plunger, and a threaded spindle with an unscrewing appliance situated over each mold with means to yieldingly support them in an elevated position, combined with a single depressing mechanism having a fixed position, under which the molds with their threaded spindles and attachments as described are successively brought, and whereby, in its actuation, a mold is covered by its follower and plunger, and a threaded spindle plunged therein, substantially as specified.

THOS. C. DUFFIELD.

Witnesses:
JONATHAN B. PARKER,
DANIEL M. PARKER.